UNITED STATES PATENT OFFICE.

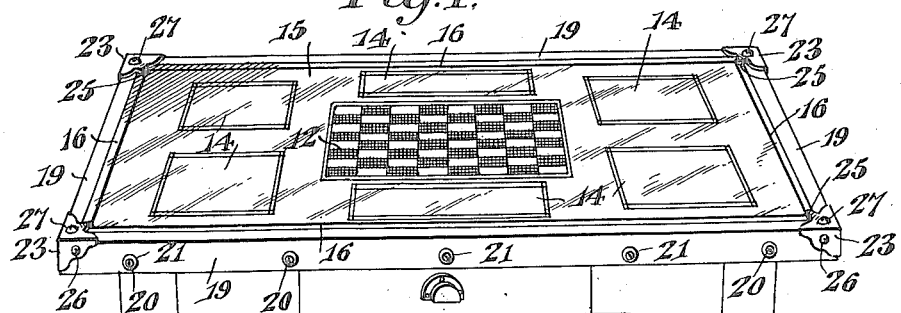

PHILIP A. ZINDEL, OF LOCK HAVEN, PENNSYLVANIA.

ADVERTISING ATTACHMENT FOR TABLES.

1,207,460.　　　　　　　Specification of Letters Patent.　　　Patented Dec. 5, 1916.

Application filed February 14, 1916. Serial No. 78,243.

*To all whom it may concern:*

Be it known that I, PHILIP A. ZINDEL, a citizen of the United States, residing at Lock Haven, in the county of Clinton and State of Pennsylvania, have invented a new and useful Advertising Attachment for Tables, of which the following is a specification.

The present invention relates to an improved table or attachment therefor, and has for its object to provide a game table for use in public places, such as hotels, clubs, or the like, and which has means for supporting, in constant view, a number of advertisements, or the like, which may be easily placed in and removed from the top of the table.

An important feature of the present invention is in providing a table top with an inlaid checker board, or the like, and with a space about the checker board in which advertisements and the like may be pasted, laid, or otherwise suitably positioned around the checker board.

The table top is provided with a marginal strip projecting above the top and adapted to receive therein a transparent panel. The panel is supported at its marginal edge upon a strip of felt, or the like, which is secured to the table top and against the inner side of the marginal strip. Corner irons secure the corners of the strip and reinforce the same, and are provided with inwardly extending lips adapted to bear upon the upper face and at the corners of the transparent panel to hold the same within the marginal strip.

Other objects and advantages of the invention will be brought out in the following specific disclosure of the present preferred embodiment, the same being illustrated in the accompanying drawing, wherein—

Figure 1 is a perspective view of a game table, embodying the features of this invention. Fig. 2 is a longitudinal sectional view, enlarged, through the central portion of the table. Fig. 3 is a detail enlarged plan view of one corner of the table. Fig. 4 is a detail sectional view, taken on the line 4—4 of Fig. 3. Fig. 5 is a fragmentary sectional view, taken through the marginal strip and the securing means therefor.

Referring to this drawing, wherein like parts are designated by similar numerals of reference throughout the several views, 10 designates a table structure of any approved form, provided on its upper end with a top 11. The top 11 is shown in the present instance as being of the usual rectangular form and having a flat uninterrupted upper face. The table top 11 is preferably provided in its upper face with an inlaid checker board 12, located at the central portion of the top 11, so as to provide at the opposite sides, and at the opposite ends of the checker board 12, a space 13 adapted to receive advertisements 14, or the like, which are to be placed on display, and held constantly in view of the persons using the table.

For the purpose of protecting not only the checker board 12, but also the advertisements 14, a transparent panel 15 is placed over the top 11 of the table. This panel 15 is preferably a glass panel beveled at its edges as at 16, the beveled faces meeting at the corners of the panel 15 in inclined diagonal edges 17. These inclined beveled edges 17 extend outwardly and downwardly to the marginal edge of the panel 15, the latter forming a relatively narrow edge 18. This edge 18 is adapted to seat against the inner side of a marginal strip 19 which is secured about the edge of the top 11 by means of screws 20, which pass inwardly through the marginal strip 19 and into the edge of the table top 11. These screws 20 project inwardly through convexed washers 21, of fanciful color and form, to hold the washers against the outer face of the strip 19. These washers 21 are preferably of spherical form and have depressions in their outer sides to receive the heads of the screws 21 in counter-sunk relation therein. The strip 19 projects above the upper face of the top 11 a sufficient height to place the upper edge of the strip 19 flush with the lower edge of the bevel 16 of the glass panel, thereby disposing the upper face of the glass considerably above the upper edge of the strip 19, as shown to advantage in Fig. 4. This glass panel 15 is supported upon a packing strip 22, which is placed upon, and preferably secured to, the upper face of the top 11 of the table and lies against the inner side of the strip 19. This packing strip 22 is preferably of felt. The marginal edge 18 of the panel 15 is ground to the required dimensions, so as to snugly seat or fit against the marginal strip 19 of the table top. The glass panel is of considerable weight and consequently presses down upon the packing strip 22 sufficiently to form a sealed joint between the transparent panel 15 and the top 11. Thus, dust, moisture, and other accumulations cannot collect beneath the glass panel, and the table top, with its checker board and advertisements, is protected.

The glass panel 15 is held within the strip 19 by a number of corner irons 23 which engage over each corner of the table. In the form of table shown in the present instance, four of the corner irons 23 are employed. The corner irons lap about the side and end portions of the strip 19, and also lap over and extend diagonally across the upper edges of these portions of the strip. These diagonal portions 24 of the corner irons have, intermediate their inner edges, inwardly extending lips 25, which have sufficient elasticity to admit of their flexing or bending upwardly to lap against the inclined corner edge 17 of the beveled glass panel 15, as shown in Fig. 4. These corner irons 23 are held in place in any suitable manner, such as by means of screws 26. In placing the corner irons, the same are engaged over the corners of the strip 19 and are pressed downwardly upon the upper edge of the strip, so as to force the corner iron down upon the beveled corner of the panel 15 and thus bend or flex the lip 25 to conform to the inclination of the corner edge 17. The resilient lips 25 of the corner irons exert sufficient pressure upon the corners of the glass panel to retain the latter within the strip 19, should the table be tilted, overturned, or otherwise upset, either accidently by tilting over, or intentionally for packing, and the like.

It is thus seen that by such a construction of table, the top is completely covered and inclosed, and the articles or advertisements placed on the top are visible at all times. It will also be noted that the improved mounting of the glass panel provides a dust proof and moisture proof seal or closure around the edges of the panel without using undercut or beveled edges for the strips. When it is desired to interchange the advertisements 14 placed on the table top 11, the adjacent corner irons are removed from the strip 19, and a section of the strip is removed, whereby the glass panel may be slid toward the open front of the table to clear the remaining corner irons, and may be then lifted out.

It is, of course, understood that the table top 11 may be provided with a game board of any character, or with other devices which attract attention, to be used in public places. It is also understood that various other changes and modifications may be made in the above specifically set forth embodiment of the invention without departing from the spirit thereof, and limited only by the scope of the following claim.

If desired, for the purpose of further securing the corner irons 23, screws 27 may be employed which are passed downwardly through the tops of the corner irons 23 and into the upper edge of the strip 19. These screws 27 thus firmly bind the lips of the corner irons down upon the beveled corners of the panel.

What is claimed is:—

The combination with a rectangular table top having its upper face provided with a game board and spaces to receive advertisements, marginal strips secured about the edges of the table top and projecting above the same, cushion strips arranged upon the upper face of the table top against the inner sides of said marginal strips, a transparent rectangular panel beveled along its marginal edges and seated upon the cushion strips within the marginal strips, irons applied to the meeting ends of the marginal strips and rigidly embracing the sides and tops of said strips at the corners of the table top, said corner irons having flexible lips located diagonally thereof and extending inwardly beyond the marginal strips and engaging the beveled marginal edges of the panel at the corners thereof, and means for securing the corner irons to said marginal strips.

In testimony that I claim the foregoing as my own I have hereto affixed my signature in the presence of two witnesses.

PHILIP A. ZINDEL.

Witnesses:
JOHN H. SIGGERS,
EDITH L. BROWN.